United States Patent
Wang et al.

(10) Patent No.: US 8,687,383 B2
(45) Date of Patent: Apr. 1, 2014

(54) INVERTER AND ACTIVE POWER FILTER SYSTEM UTLIZING AN AUXILIARY CAPACITOR MODULE

(75) Inventors: Bin Wang, Shanghai (CN); Shouyan Wang, Shanghai (CN); Xibing Ding, Shanghai (CN); Hongyang Wu, Shanghai (CN); Shaohua Chen, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/616,076

(22) Filed: Sep. 14, 2012

(65) Prior Publication Data
US 2013/0229837 A1    Sep. 5, 2013

(30) Foreign Application Priority Data

Mar. 2, 2012  (CN) .......................... 2012 1 0054184

(51) Int. Cl.
*H02M 3/335*    (2006.01)
*H02M 1/14*     (2006.01)

(52) U.S. Cl.
USPC ................... 363/17; 363/39; 363/40; 363/41; 363/95; 363/98; 363/131; 363/132

(58) Field of Classification Search
USPC .............. 363/17, 39, 40, 41, 95, 98, 131, 132
See application file for complete search history.

(56) References Cited

U.S. PATENT DOCUMENTS

| | | | | |
|---|---|---|---|---|
| 5,905,642 A * | 5/1999 | Hammond | ...................... | 363/37 |
| 6,690,592 B2 * | 2/2004 | Link | ............................... | 363/98 |
| 6,794,929 B2 * | 9/2004 | Pelly | ............................. | 327/552 |
| 6,850,424 B2 * | 2/2005 | Baudelot et al. | ................ | 363/37 |
| 6,995,992 B2 * | 2/2006 | Wei et al. | ......................... | 363/34 |
| 7,187,229 B2 * | 3/2007 | Pelly | ............................. | 327/551 |
| 7,190,143 B2 * | 3/2007 | Wei et al. | ...................... | 318/606 |
| 7,385,438 B2 * | 6/2008 | Pelly | ............................. | 327/551 |
| 8,310,848 B2 * | 11/2012 | Sakakibara | ..................... | 363/37 |
| 2002/0172063 A1 * | 11/2002 | Link | ............................. | 363/132 |
| 2007/0030706 A1 * | 2/2007 | Wei et al. | ........................ | 363/44 |
| 2008/0180164 A1 * | 7/2008 | Pelly | ............................. | 327/552 |
| 2009/0140577 A1 * | 6/2009 | Fishman | ......................... | 307/82 |
| 2011/0299311 A1 * | 12/2011 | Zhu et al. | ...................... | 363/132 |

* cited by examiner

*Primary Examiner* — Bao Q Vu
(74) *Attorney, Agent, or Firm* — Morris Manning & Martin LLP; Tim Tingkang Xia, Esq.

(57) ABSTRACT

An inverter and an active power filter system have been disclosed in the invention, so that the application range of the inverter under the occasions of different capacitor requirement can be widened, the cost can be decreased, and the efficiency can be improved. The technical scheme is: an auxiliary capacitor module can be added on the traditional inverter structure and connected in parallel selectively with the capacitor in the inverter. In a system without connecting an external auxiliary capacitor module, the value of capacitance can be designed to be smaller to satisfy the application under normal occasions. If the device operates under the occasions having large harmonic current or having large neutral line current, the ripple current on the capacitor will be larger so that large capacitance will be required to satisfy the life requirement, therefore, the problem can be solved by a method of installing an auxiliary capacitor module.

26 Claims, 10 Drawing Sheets

INVERTER AND ACTIVE POWER FILTER SYSTEM UTLIZING AN AUXILIARY CAPACITOR MODULE

CROSS-REFERENCE TO RELATED APPLICATION

This non-provisional application claims priority under 35 U.S.C. §119(a) on Patent Application No. 201210054184.0 filed in P.R. China on Mar. 2, 2012, the entire contents of which are hereby incorporated by reference.

FIELD OF THE INVENTION

The disclosure relates to an inverter structure, particularly, to an inverter assembled with auxiliary capacitor module and an active power filter system.

BACKGROUND OF THE INVENTION

With the rapid development of the power electronic technology, the application of the power electronic devices is more and more extensive. Wherein, the inverter is used widely in the application occasions, such as uninterruptible power supply (UPS), active power filter (APF), static var generator (SVG), and the like. In the art, various attempts and efforts have been made aiming at improving the respective specifications, such as decreasing the volume of the inverter, improving the efficiency of the inverter, reducing the cost of the inverter, decreasing the output harmonics of the inverter, increasing the applicability of the inverter, in various occasions, however, various circuit topologies have their respective limitations, and the respective problems cannot be solved excellently.

The prior inverter topology is shown mainly in FIG. 1~FIG. 2. Wherein FIG. 1 shows a normally used 3p4w structure of two-level inverter, in which the neutral line is connected directly with the midpoint of a bus capacitor. Conversely, if the neutral line is not connected with N, then it will be a 3p3w structure. The three phases can be decoupled completely because of the existence of the neutral line, and also can be controlled individually. However, the neutral line current flows through the bus capacitor, and it is required to design a large bus capacitor in order to suppress the ripple current. If it is a 3p3w structure and a specific order of harmonic current is required to be outputted, such as the second harmonic current, similarly, it is necessary to design a large capacitor to conform to the life requirement of the direct current capacitor. FIG. 2 shows a 3p4w structure of three-level inverter. Similarly, the neutral line is connected with the midpoint of a bus capacitor, if it is not connected, then it will be a 3p3w structure. In 3p4w structure, the neutral line current flows through the bus capacitor, and it is required to design a large bus capacitor in order to suppress the ripple current. If it is a 3p3w structure and a specific order of harmonic current is required to be outputted, such as the second harmonic current, similarly, it is necessary to design a large capacitor to conform to the life requirement of the direct current capacitor In different application occasions, if neutral line current and specific order current are not necessary to be outputted, then only smaller direct current bus capacitor will conform to the life requirement. While in some specific application occasions, large neutral line current or specific order harmonic current are required, then larger direct current bus capacitor is required to conform to the life requirement of the capacitor. For the versatility of the product, normally, the capacitor is designed to be larger, however, in the normal application occasions, it causes a waste of the capacity of the direct current capacitor.

In view of this, a subject to be solved in the art by the related technicians is how to design a novel inverter, wherein one of the problems of the versatility of the capacitor design has been solved and it can be applied to various occasions.

BRIEF SUMMARY OF THE INVENTION

An object of the disclosure is to solve one of the above problems, and to provide an inverter having auxiliary capacitor module so that the application range of the inverter can be widened under the occasions of different capacitor requirement, the cost can be decreased, and the efficiency can be improved.

Another object of the disclosure is to provide a multiple-inverter so that the application range of the inverter can be widened under the occasions of different capacitor requirements, the cost can be decreased, and the efficiency can be improved.

A further object of the disclosure is to provide an active power filter system so that the application range of the inverter can be widened under the occasions of different capacitor requirements, the cost can be decreased, and the efficiency can be improved.

The technical scheme of the disclosure is that an inverter is disclosed in the disclosure, said inverter comprises:

a three-phase inverter bridge composed of a plurality of switching devices;

a first inverter output inductor module comprising the first phase inverter output inductor module, a second phase inverter output inductor module, and a third phase inverter output inductor module, wherein each phase inverter output inductor module comprises at least one inductor. One terminal of the first phase, the second phase, and the third phase inverter output inductor module is coupled correspondingly to the first phase, the second phase, and the third phase of the three-phase inverter bridge; another terminal of the first phase, the second phase, and the third phase inverter output inductor module forms the first, the second, and the third phase outputs of the inverter, respectively;

a capacitor assembly comprising at least one capacitor, a first terminal and a second terminal, said capacitor assembly is connected in parallel with said three-phase inverter bridge;

an auxiliary capacitor module comprising at least one capacitor, a first terminal and a second terminal. The first terminal of said auxiliary capacitor module and the first terminal of said capacitor assembly are connected selectively; the second terminal of said auxiliary capacitor module and the second terminal of said capacitor assembly are connected selectively.

According to an embodiment of the inverter of the disclosure, resistors connected in parallel are further disposed in said auxiliary capacitor module.

According to an embodiment of the inverter of the disclosure, said inverter further comprises a neutral line, said neutral line is connected with the midpoint of said capacitor assembly and the midpoint of said auxiliary capacitor module.

According to an embodiment of the inverter of the disclosure, said inverter further comprises a first neutral line inductor module, and said first neutral line inductor module comprises at least one inductor. The first terminal of said first neutral line inductor module is connected to the midpoint of said capacitor assembly; the second terminal of said first neutral line inductor module is connected to said neutral line.

Said auxiliary capacitor module further comprises a second neutral line inductor module, and the second neutral line inductor module comprises at least one inductor. The first terminal of the second neutral line inductor module of said auxiliary capacitor module is connected to the midpoint of said auxiliary capacitor module; the second terminal of the second neutral line inductor module of said auxiliary capacitor module is connected to said neutral line.

According to an embodiment of the inverter of the disclosure, said inverter further comprises a neutral line switching element. Said neutral line switching element comprises a control terminal, a first terminal and a second terminal. The first terminal of said neutral line switching element is connected to the second terminal of said first neutral line inductor module and the second terminal of the second neutral line inductor module; the second terminal of said neutral line switching element is connected to said neutral line.

According to an embodiment of the inverter of the disclosure, said inverter further comprises a first neutral line switching element and a second neutral line switching element. Each of said neutral line switching elements comprises a control terminal, a first terminal and a second terminal. Said first neutral line switching element is connected in series with said first neutral line inductor module, said second neutral line switching element is connected in series with the second neutral line inductor module.

According to an embodiment of the inverter of the disclosure, said inverter is a two-level inverter or a three-level inverter.

According to an embodiment of the inverter of the disclosure, said inverter further comprises:

a second inverter output inductor module comprising a first phase inverter output inductor module, a second phase inverter output inductor module, and a third phase inverter output inductor module, wherein each of the phase inverter output inductor modules comprises at least one inductor. The first phase, the second phase and the third phase inverter output inductor module is connected in series with the first phase, the second phase and the third phase inverter output inductor module of said first inverter output inductor module, respectively; and three groups of filter assemblies comprising the first group of filter assemblies, the second group of filter assemblies and the third group of filter assemblies. Each group of the filter assemblies at least comprises a capacitor. The first group, the second group, and the third group of filter assemblies is connected correspondingly with: a common connection point between the first phase inverter output inductor module of said first inverter output inductor module and the first phase inverter output inductor module of said second inverter output inductor module, a common connection point between the second phase inverter output inductor module of said first inverter output inductor module and the second phase inverter output inductor module of said second inverter output inductor module, and a common connection point between the third phase inverter output inductor module of said first inverter output inductor module and the third phase inverter output inductor module of said second inverter output inductor module, respectively;

wherein each group of filter assemblies at least comprises one of the following four forms:

a filter in which at least two capacitors connected in parallel and/or in series;
a damping filter composed of capacitors and resistors;
a notch filter composed of capacitors and inductors;
a notch filter composed of capacitors and inductors, and a damping filter composed of capacitors and resistors, wherein said notch filter and said damping filter are connected in parallel.

According to an embodiment of the inverter of the disclosure, when the capacitance of the capacitor assembly is required to be increased in order to satisfy the requirement of filtering the ripple current by the capacitor, the first terminal of said auxiliary capacitor module is connected to the first terminal of said capacitor assembly, and the second terminal of said auxiliary capacitor module is connected to the second terminal of said capacitor assembly.

According to an embodiment of the inverter of the disclosure, when the capacitance of the capacitor assembly satisfies the requirement of filtering the ripple current by the capacitor, the first terminal of said auxiliary capacitor module and the first terminal of said capacitor assembly are disconnected and/or the second terminal of said auxiliary capacitor module and the second terminal of said capacitor assembly are disconnected.

A multiple inverter is also disclosed in the disclosure, wherein said multiple inverter comprises:

at least two inverter units, wherein each inverter unit comprises:

a three-phase inverter bridge composed of a plurality of switching devices;

a capacitor assembly comprising at least one capacitor, a first terminal and a second terminal, wherein said capacitor assembly is connected in parallel with said three-phase inverter bridge; and an inverter unit output inductor module comprising a first phase inverter unit output inductor module, a second phase inverter unit output inductor module, and a third phase inverter unit output inductor module, wherein each phase inverter unit output inductor module comprises at least one inductor. The first terminal of the first phase, the second phase, and the third phase inverter unit output inductor module is coupled correspondingly to the first phase, the second phase, and the third phase of the three-phase inverter bridge;

three-phase outputs of the multiple inverter comprise the first phase output, the second phase output and the third phase output. The second terminals of the first phase inverter unit output inductor modules of inverter units are connected together to form the first phase output of the multiple inverter; the second terminals of the second phase inverter unit output inductor modules of inverter units are connected together to form the second phase output of the multiple inverter; the second terminals of the third phase unit output inductor modules of inverter units are connected together to form the third phase output of the multiple inverter; and an auxiliary capacitor module comprising at least two capacitor module groups. Each capacitor module group comprises at least one capacitor, a first terminal and a second terminal, wherein the first terminal of one capacitor module group and the first terminal of the capacitor assembly of one of the inverter units are connected selectively, and the second terminal of the capacitor module group and the second terminal of the capacitor assembly of said inverter unit are connected selectively;

wherein the drive signals of the switching devices of the three-phase inverter bridge of the respective inverter units have certain angle difference with each other.

According to an embodiment of the multiple inverter of the disclosure, resistors connected in parallel are further comprised in each capacitor module group of said auxiliary capacitor module.

According to an embodiment of the multiple inverter of the disclosure, each inverter unit further comprises a first neutral line inductor module, which comprises at least one inductor. The first terminal of the first neutral line inductor module of each inverter unit is connected to the midpoint of the capacitor assembly of each inverter unit; the second terminal of the first neutral line inductor module of each inverter unit is connected to said neutral line. Each capacitor module group of said auxiliary capacitor module further comprises a second neutral line inductor module, which comprises at least one inductor. The first terminal of the second neutral line inductor module is connected to the midpoint of each capacitor module group of said auxiliary capacitor module, and the second terminal of the second neutral line inductor module is connected to said neutral line.

According to an embodiment of the multiple inverter of the disclosure, each inverter unit further comprises a neutral line switching element, and each neutral line switching element comprises a control terminal, a first terminal and a second terminal. The first terminal of each neutral line switching element is connected correspondingly to the second terminal of the first neutral line inductor module of its corresponding inverter unit and the second terminal of the second neutral line inductor module of the capacitor module group of its corresponding auxiliary capacitor module; the second terminal of each neutral line switching element is connected to said neutral line.

According to an embodiment of the multiple inverter of the disclosure, each inverter unit further comprises a first neutral line switching element and a second neutral line switching element. Each switching element comprises a control terminal, a first terminal and a second terminal. The first neutral line switching element of each inverter unit is connected in series with the first neutral line inductor module of its corresponding inverter unit; the second neutral line switching element of each inverter unit is connected in series with the second neutral line inductor module of the capacitor module group of its corresponding auxiliary capacitor module.

According to an embodiment of the multiple inverter of the disclosure, each inverter unit in said inverter is a two-level inverter unit or a three-level inverter.

According to an embodiment of the multiple inverter of the disclosure, said inverter further comprises:

a multiple inverter output inductor module, comprising a first phase multiple inverter output inductor module, a second phase multiple inverter output inductor module, and a third phase multiple inverter output inductor module, wherein each phase multiple inverter output inductor module comprises at least one inductor. The first phase, the second phase and the third phase multiple inverter output inductor module is coupled correspondingly to the first phase, the second phase and the third phase outputs of said multiple inverter, respectively;

three coupling points: the first coupling point is formed by the connection point between the second terminals of the first phase inverter unit output inductor modules of inverter units and the first phase multiple inverter output inductor module, the second coupling point is formed by the connection point between the second terminals of the second phase inverter unit output inductor modules of inverter units and the second phase multiple inverter output inductor module, and the third coupling point is formed by the connection point between the second terminals of the third phase inverter unit output inductor modules of inverter units and the third phase multiple inverter output inductor module; and three groups of filter assemblies, comprising the first group of filter assemblies, the second group of filter assemblies, and the third group of filter assemblies, wherein each group of filter assemblies comprises at least one capacitor. The first group, the second group and the third group of filter assemblies are coupled correspondingly to the first, the second, and the third coupling points.

Wherein, each group of filter assemblies at least comprises one of the following four forms:

a filter in which at least two capacitors connected in parallel and/or in series;

a damping filter composed of capacitors and resistors;

a notch filter composed of capacitors and inductors;

a notch filter composed of capacitors and inductors, and a damping filter composed of capacitors and resistors, wherein said notch filter and said damping filter are connected in parallel.

According to an embodiment of the multiple inverter of the disclosure, when the capacitance of the capacitor assembly is required to be increased in order to satisfy the requirement of filtering the ripple current by the capacitor, the first terminal of one of the capacitor module groups is connected to the first terminal of the capacitor assembly of one of the inverter units, and the second terminal of said capacitor module group is connected to the second terminal of the capacitor assembly of said inverter unit.

According to an embodiment of the inverter of the disclosure, when the capacitance of the capacitor assembly of said inverter satisfies the requirement of filtering the ripple current by the capacitor, the first terminal of one of the capacitor module group and the first terminal of said capacitor assembly of one of the inverter units are disconnected and/or the second terminal of said capacitor module group and the second terminal of the capacitor assembly of said inverter unit are disconnected.

An active power filter system is also disclosed in the disclosure, said active power filter system comprises:

at least two inverter modules, said at least two inverter modules are connected in parallel;

at least one auxiliary capacitor module, said auxiliary capacitor module comprises at least one capacitor, wherein each auxiliary capacitor module and at least one inverter module of said at least two inverter modules are connected in parallel selectively.

According to an embodiment of the active power filter system of the disclosure, one auxiliary capacitor module is disposed between each two adjacent inverters, and said auxiliary capacitor module are connected in parallel with two adjacent inverter modules.

According to an embodiment of the active power filter system of the disclosure, said auxiliary capacitor module further comprises resistors connected in parallel.

According to an embodiment of the active power filter system of the disclosure, said inverter module is a two-level inverter which comprises a three-phase inverter bridge arm, an inverter output inductor module, and a capacitor assembly, wherein said capacitor assembly and said three-phase inverter bridge arm are connected in parallel.

According to an embodiment of the active power filter system of the disclosure, said inverter is a three-level inverter which comprises a three-phase inverter bridge arm, an inverter output inductor module, and a capacitor assembly, wherein said capacitor assembly and three-phase inverter bridge arm are connected in parallel.

According to an embodiment of the active power filter system of the disclosure, said inverter module is a multiple inverter, said multiple inverter comprises:

at least two inverter units, wherein each inverter unit comprises:

a three-phase inverter bridge composed of a plurality of switching devices;

a capacitor assembly comprising at least one capacitor, said capacitor assembly is connected in parallel with said three-phase inverter bridge; and an inverter unit output inductor module comprising a first phase inverter unit output inductor module, a second phase inverter unit output inductor module, and a third phase inverter unit output inductor module, wherein each phase inverter unit output inductor module comprises at least one inductor. The first terminal of the first phase, the second phase, and the third phase inverter unit output inductor module is coupled correspondingly to the first phase, the second phase, and the third phase of the three-phase inverter bridge;

three-phase-output of the multiple inverter comprises the first phase output, the second phase output and the third phase output. The second terminals of the first phase inverter unit output inductor modules of inverter units are connected together to form the first phase output of the multiple inverter; the second terminals of the second phase inverter unit output inductor modules of inverter units are connected together to form the second phase output of the multiple inverter; the second terminals of the third phase inverter unit output inductor modules of inverter units are connected together to form the third phase output of the multiple inverter.

By comparing the disclosure with the relate art, one of the following benefits will exist: the scheme of the disclosure is to add an auxiliary capacitor module to the traditional inverter structure, wherein the auxiliary capacitor module and the capacitor assembly of the inverter are installed in parallel selectively. In a system without connecting an external capacitor module, the capacitance of the capacitor assembly can be designed to be smaller in order to satisfy the application in normal occasions, for example, generating the active and reactive current of the fundamental wave, generating a part of the notch current and neutral line current. In such applications, the ripple current of the capacitor is smaller and it is easy to satisfy the life requirement, therefore, a smaller capacitor can be designed. If a device is used to operate in large notch current occasions or large neutral line current occasions, then the ripple current on the capacitor will be large and large capacitance will be required to satisfy the life requirement, therefore, the problem will be solved by adding auxiliary capacitor module. In this way, in occasions without specific requirement, the application of the main power module without auxiliary capacitor module can satisfy the requirement, however, in occasions with specific requirement, the main power module is not required to re-design, the only need is to add an auxiliary capacitor module to satisfy the requirement.

DETAILED DESCRIPTION OF THE INVENTION

The disclosure will be further described by incorporating the drawings and embodiments as follows.

Figure 3:
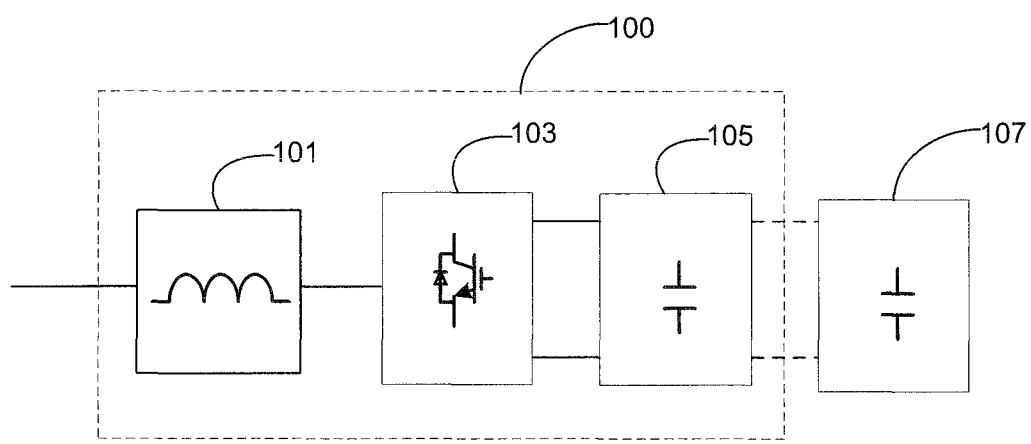
FIG. 3 shows a schematic structure diagram of an inverter with auxiliary capacitor module in an embodiment of the disclosure.
Figure 4:
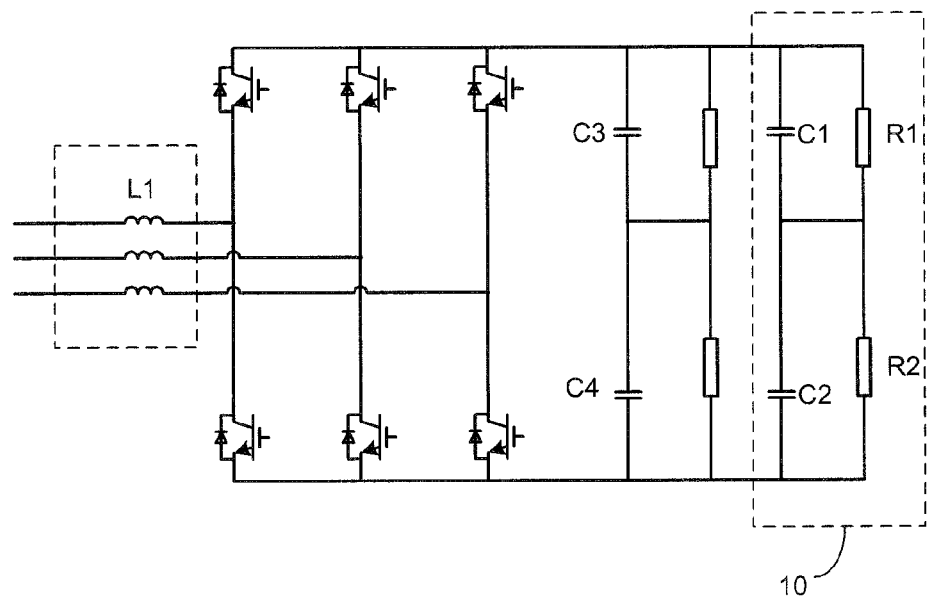
FIG. 4 shows a structure of a two-level inverter with auxiliary capacitor module in an embodiment of the disclosure.

FIG. 3 shows a schematic structure diagram of an inverter with auxiliary capacitor module in an embodiment of the disclosure. Referring to FIG. 3, the inverter in the embodiment comprises: a main power circuit 100 and an auxiliary capacitor module 107 (it may be one module or at least two modules). Wherein the main power circuit 100 comprises: a first inverter output inductor module 101, a three-phase inverter bridge 103 formed by a plurality of switching devices, and a capacitor assembly 105. The first inverter output inductor module 101 comprises a first phase inverter output inductor module, a second phase inverter output inductor module, and a third phase inverter output inductor module, wherein each phase inverter output inductor module comprises at least one inductor L1, as shown in FIG. 4. One terminal of the first phase, the second phase, and the third phase inverter output inductor module is connected correspondingly to the first phase, the second phase and the third phase of said three-phase inverter bridge, respectively; another terminal of the first phase, the second phase, and the third phase inverter output inductor module forms the first, the second, and the third phase output of the inverter, respectively. The capacitor assembly 105 comprises at least one capacitor, a first terminal and a second terminal, and the capacitor assembly 105 is connected in parallel with the three-phase inverter bridge 103. The auxiliary capacitor module 107 comprises at least one capacitor, a first terminal and a second terminal. The first terminal of said auxiliary capacitor module 107 and the first terminal of said capacitor assembly 105 are connected selectively; the second terminal of said auxiliary capacitor module 107 and the second terminal of said capacitor assembly 105 are connected selectively. In normal occasions, for example, generating the active and reactive current of the fundamental wave, generating a part of the notch current and neutral line current, the ripple current of the capacitor is smaller and it is easy to satisfy the life requirement. Therefore, a smaller capacitor can be designed and the auxiliary capacitor module 107 is not required. That is, in such application, the first terminal of said auxiliary capacitor module 107 and the first terminal of said capacitor assembly 105 are disconnected and/or the second terminal of said auxiliary capacitor module 107 and the second terminal of said capacitor assembly 105 are disconnected. If a device is required to operate in large notch current occasions or large neutral line current occasions, then the ripple current on the capacitor will be large, so that large capacitance will be required to satisfy the life requirement. Therefore, the problem will be solved by adding an auxiliary capacitor module 107, that is, the first terminal of said auxiliary capacitor module 107 and the first terminal of said capacitor assembly 105 are connected, and the second terminal of said auxiliary capacitor module 107 and the second terminal of said capacitor assembly 105 are connected. In this way, in occasions without specific requirement, the application of the main power module without auxiliary capacitor module can satisfy the requirement. However, in occasions with specific requirement, the main power module is not required to re-design, the only need is to add an auxiliary capacitor module to satisfy the requirement. That is, said capacitor module is an aid, when it is required in the application occasions, said capacitor module and the capacitor assembly in the main power circuit are connected in parallel; when it is not required in the application occasions, the auxiliary capacitor module is not installed. That is, said auxiliary capacitor module can be connected selectively with the inverter.

FIG. 4 shows a structure of a two-level inverter with auxiliary capacitor module in an embodiment of the disclosure. Referring to FIG. 4, a capacitor assembly is disposed inside the main power circuit of the two-level inverter, and said capacitor assembly comprises capacitors C3 and C4. The first inverter may also comprises an auxiliary capacitor module 10, which is comprised by capacitors C1 and C2. The auxiliary capacitor module is connected selectively with the inverter, that is, the capacitors C1 and C2 is connected in parallel selectively with the capacitor assembly C3, C4 inside the inverter. In an embodiment of the disclosure, the resistors connected in parallel can also be disposed inside the capacitor assembly and auxiliary capacitor module 10 of said main power circuit, for example, in the capacitor module 10, the resistors R1, R2 and the capacitors C1, C2 are connected in parallel.

Figure 5:
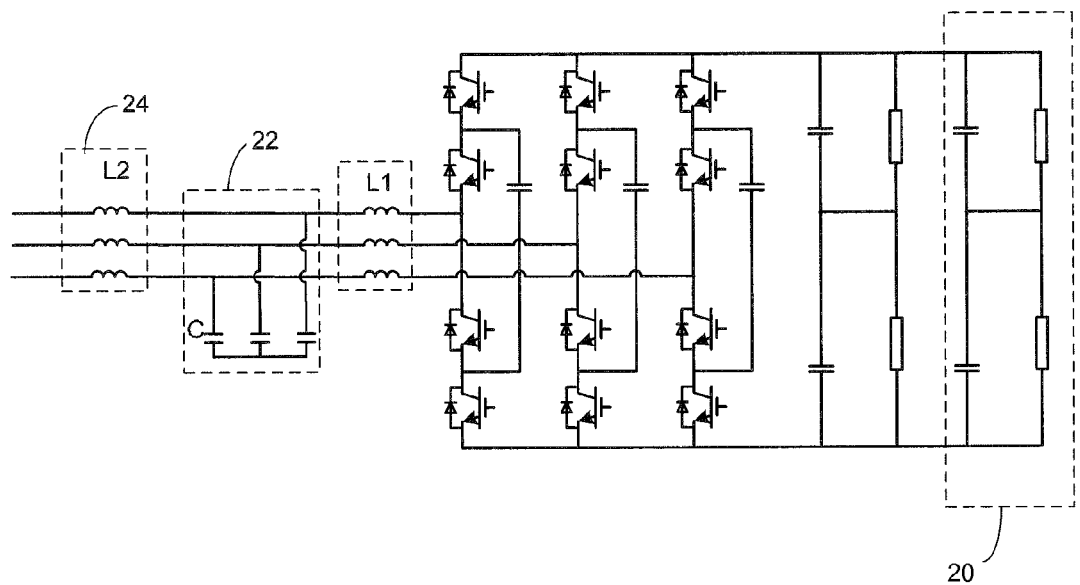
FIG. 5 shows a structure of a three-level inverter with auxiliary capacitor module having flying capacitor in an embodiment of the disclosure.

In the disclosure, said inverter may be a structure of two-level inverter, or a structure of three-level inverter, as shown in FIG. 4. and FIG. 5. FIG. 5 shows a structure of a three-level inverter with auxiliary capacitor module 20 having flying capacitor in an embodiment of the disclosure. Apart from three-level inverter having flying capacitor, it can also be a three-level inverter of other forms, for example, three-level inverter of midpoint clamped type. The remaining structure in FIG. 5 is the same as that in FIG. 4, and it will not be repeated herein.

Figure 6A:
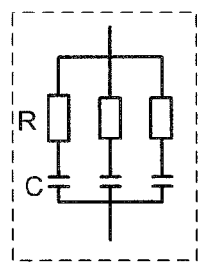
FIG. 6A shows a structure of a filter assembly in an embodiment of the disclosure.
Figure 6B:
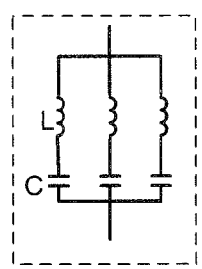
FIG. 6B shows a structure of a filter assembly in another embodiment of the disclosure.
Figure 6C:
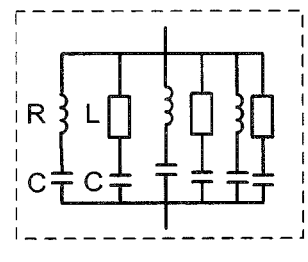
FIG. 6C shows a structure of a filter assembly in another embodiment of the disclosure.

In an embodiment of the disclosure, said inverter can also comprises three groups of filter assemblies 22 and the second inverter output inductor module 24. As shown in FIG. 5, said second inverter output inductor module 24 comprises a first phase inverter output inductor module, a second phase inverter output inductor module and a third phase inverter output inductor module. Wherein each phase inverter output inductor module comprises at least one inductor L2. The first phase, the second phase, and the third phase inverter output inductor module is connected in series with the first phase, the second phase, and the third phase inverter output inductor module of said first inverter output inductor module, respectively. Said three groups of filter assemblies 22 comprise the first group of filter assemblies, the second group of filter assemblies, and the third group of filter assemblies, as shown in FIG. 5. Each group of filter assemblies at least comprises one capacitor. The first group, the second group and the third group of filter assemblies are connected correspondingly with the common connection point of the first phase inverter output inductor module of said first inverter output inductor module and the first phase inverter output inductor module of said second inverter output inductor module, the common connection point of the second phase inverter output inductor module of said first inverter output inductor module and the second phase inverter output inductor module of said second inverter output inductor module, and the common connection point of the third phase inverter output inductor module of said first inverter output inductor module and the third phase inverter output inductor module of said second inverter output inductor module. Apart from the form of filter assembly 22 as shown in FIG. 5, the filter assembly can also be other forms, for example, a filter in which at least two capacitors are connected in parallel and/or in series; a damping filter formed by capacitors and resistors as shown in FIG. 6A; a notch filter formed by capacitors and inductors as shown in FIG. 6B; a notch filter formed by capacitors and inductors and a damping filter formed by the capacitors and resistors, wherein said notch filter and said damping filter are connected in parallel, as shown in FIG. 6C.

Figure 7A:
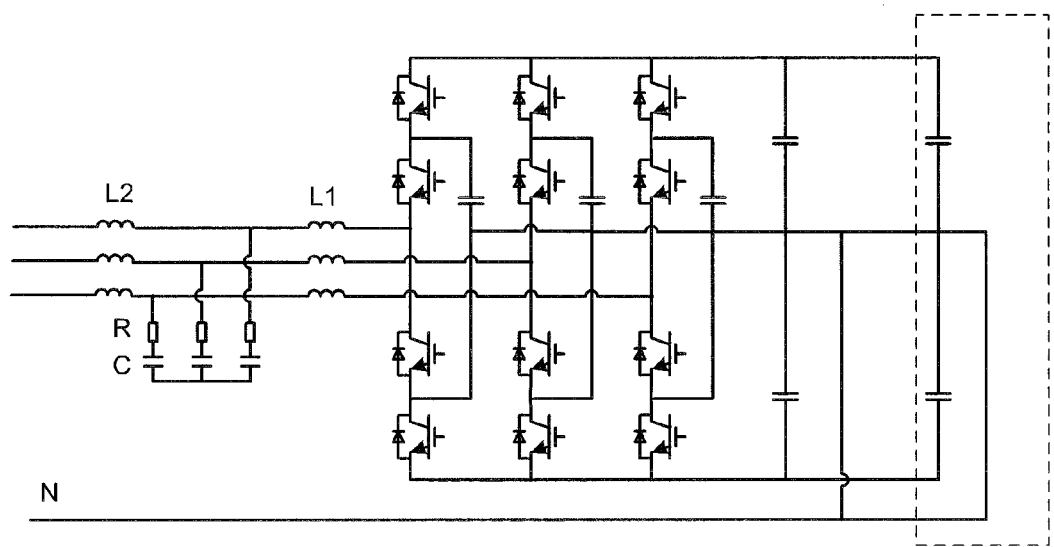
FIG. 7A shows a structure of a three-level inverter with auxiliary capacitor module having flying capacitor in another embodiment of the disclosure.
Figure 7B:
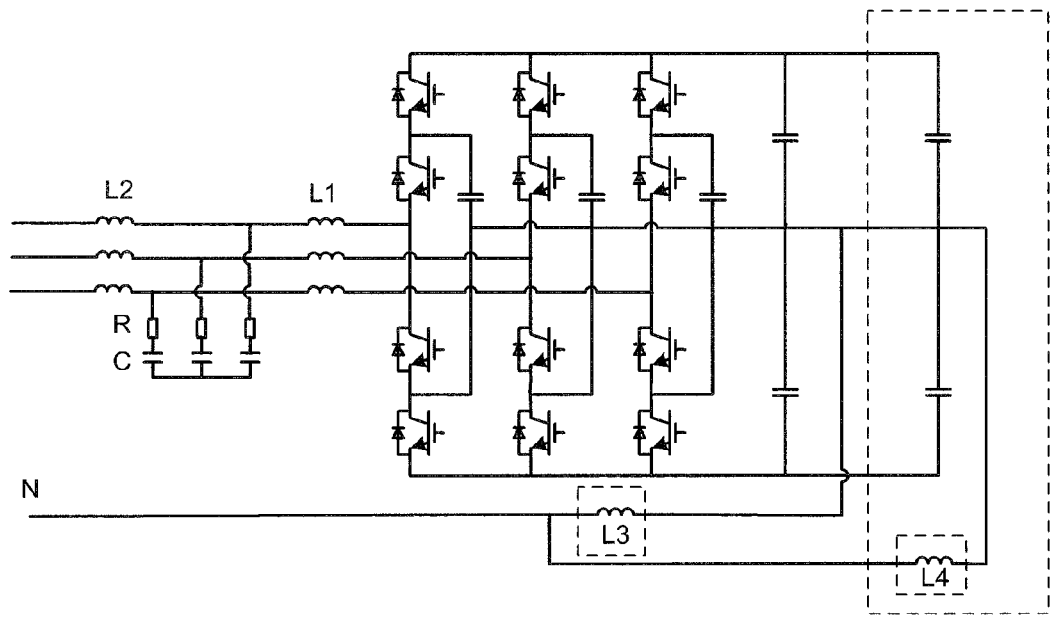
FIG. 7B shows a structure of a three-level inverter with auxiliary capacitor module having flying capacitor in another embodiment of the disclosure.
Figure 7C:
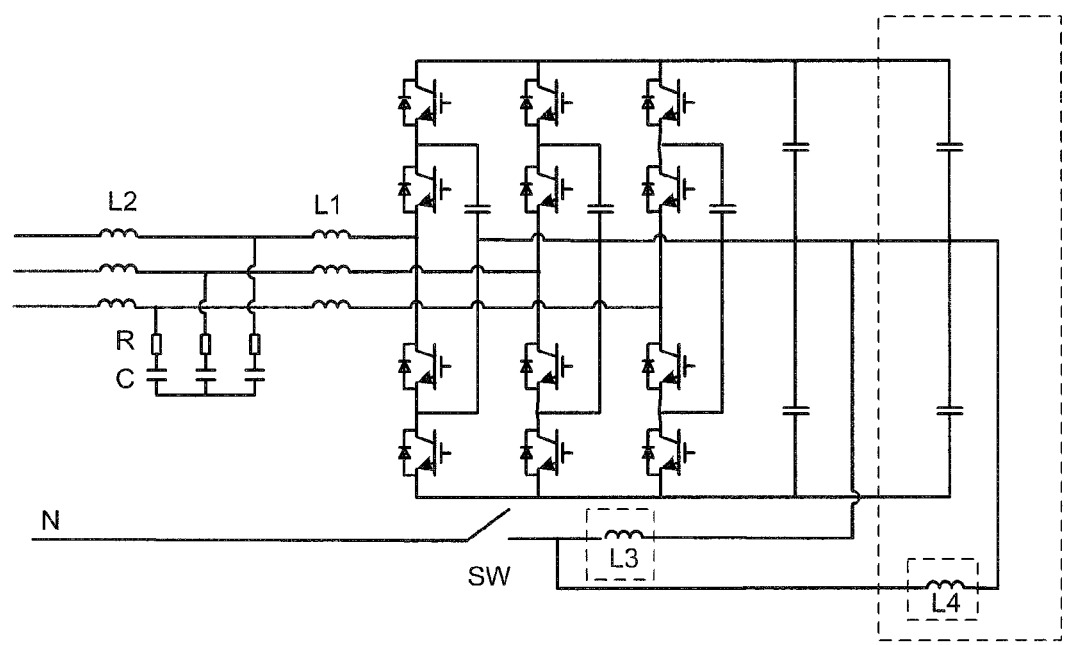
FIG. 7C shows a structure of a three-level inverter with auxiliary capacitor module having flying capacitor in another embodiment of the disclosure.

In an embodiment of the disclosure, the inverter can also comprises a neutral line N, said neutral line is connected to the midpoint of the capacitor assembly of the main power circuit and the midpoint of the auxiliary capacitor module, as shown in FIG. 7A. Said inverter further comprises a first neutral line inductor module, as shown in FIG. 7B. Said first neutral line inductor module comprises at least one inductor L3. The first terminal of the first neutral line inductor module is connected with the midpoint of the capacitor assembly of the main power circuit, and the second terminal of the first neutral line inductor module is connected to the neutral line N, as shown in FIG. 7B. Said auxiliary capacitor module further comprises a second neutral line inductor module, which comprises at least one inductor L4. The first terminal of the second neutral line inductor module is connected to the midpoint of the auxiliary capacitor module, the second terminal of the second neutral line inductor module is connected to said neutral line N. Further, the inverter also comprises a neutral line switching element SW, as shown in FIG. 7C. Said neutral line switching element comprises a control terminal, a first terminal and a second terminal. The first terminal of said neutral line switching element SW is connected to the second terminal of said first neutral line inductor module and the second terminal of said second neutral line inductor module; the second terminal of said first switching element SW is connected to said neutral line N. In another embodiment of the disclosure, the inverter further comprises a first neutral line switching element and a second neutral line switching element, each neutral line switching element comprises a control terminal, a first terminal and a second terminal. Said first neutral line switching element is connected in series with said first neutral line inductor module, and said second neutral line switching element is connected in series with said second neutral line inductor module.

Figure 8:
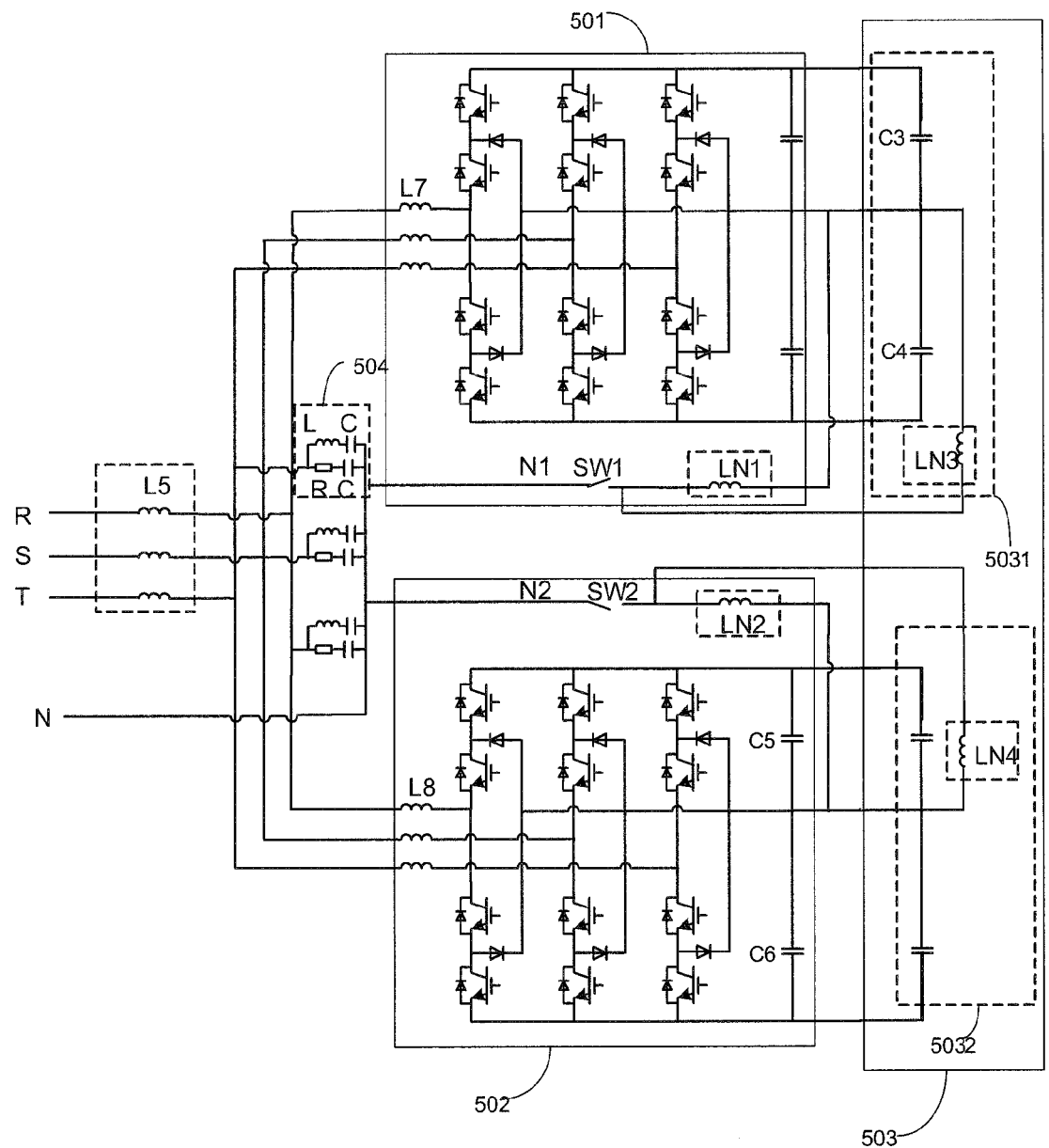
FIG. 8 shows a structure of a multiple three-level inverter with auxiliary capacitor module in an embodiment of the disclosure.

The structure of the inverter having auxiliary capacitor module as described above can also be a multiple inverter structure, the principle thereof will be described as follows by taking a multiple inverter formed by two inverter units as an example. FIG. 8 shows a structure of a three-level inverter with auxiliary capacitor module in an embodiment of the disclosure. The multiple three-level inverter comprises two three-level inverter units 501 and 502. The inverter unit 501 comprises: a three-phase inverter bridge formed by a plurality of switching devices; a capacitor assembly comprising at least one capacitor, a first terminal and a second terminal, wherein the capacitor assembly is connected in parallel with the three-phase inverter bridge; and an inverter output inductor module comprising a first phase inverter output inductor module, a second phase inverter output inductor module and a third phase inverter output inductor module, wherein each phase inverter output inductor module comprises at least one inductor L3. The first terminal of the first phase, the second phase, and the third phase inverter output inductor module is connected correspondingly to the first phase, the second phase, and the third phase of the three-phase inverter bridge, respectively. The structure of the inverter unit 502 is similar as that of the inverter unit 501, and it will not be repeated herein. The multiple inverter comprises a first phase output, a second phase output and a third phase output. The second terminals of the first phase inverter output inductor modules of two inverter units are connected together to form the first phase output of the multiple inverter; The second terminals of the second phase inverter output inductor modules of two inverter units are connected together to form the second phase output of the multiple inverter; The second terminals of the third phase inverter output inductor modules of two inverter units are connected together to form the third phase output of the multiple inverter. Said multiple inverter comprises an auxiliary capacitor module 503, which comprises two capacitor module groups 5031 and 5032. The capacitor module group 5031 comprises at least one capacitor, a first terminal and a second terminal, and the capacitor module group 5031 is connected selectively in parallel with the capacitor assembly of the inverter unit 501. The capacitor module group 5032 comprises at least one capacitor, a first terminal and a second terminal, and the capacitor module group 5032 is connected selectively in parallel with the capacitor assembly of the inverter unit 502. Wherein the drive signals of the switching devices of the three-phase inverter bridge of two inverter units have certain angle difference with each other.

In an embodiment of the disclosure, each capacitor module group of the auxiliary capacitor module also comprises resistors connected in parallel.

In an embodiment of the disclosure, as shown in FIG. 8, the inverter further comprises a first neutral line N1 and a second neutral line N2. Said first neutral line N1 is connected with the midpoint of the capacitor assembly of the inverter unit 501 and the midpoint of the capacitor module group 5031. Said second neutral line N2 is connected with the midpoint of the capacitor assembly of the inverter unit 502 and the midpoint of the capacitor module group 5032.

In an embodiment of the disclosure, as shown in FIG. 8, the inverter unit 501 further comprises a first neutral line inductor module, which comprises at least one inductor LN1. The first terminal of said first neutral line inductor module is connected to the midpoint of the capacitor assembly of the inverter unit 501; the second terminal of the first neutral line inductor module of the inverter unit is connected to the first neutral line N1. The capacitor module group 5031 (which is connected selectively with the inverter unit 501) of the auxiliary capacitor module 503 further comprises a second neutral line inductor module, which comprises at least one inductor LN3. The first terminal of the second neutral line inductor module is connected to the midpoint of the capacitor module group 5031 of the auxiliary capacitor module 503; the second terminal of the second neutral line inductor module is connected to the first neutral line N1. The inverter unit 502 further comprises a third neutral line inductor module, which said neutral line inductor module comprises at least one inductor LN2. The first terminal of said third neutral line inductor module is connected to the midpoint of the capacitor assembly of the inverter unit 502; the second terminal of the third neutral line inductor module of the inverter unit is connected to the second neutral line N2. The capacitor module group 5032 of the auxiliary capacitor module 503 (which is connected in parallel with the inverter unit 502) further comprises a fourth neutral line inductor module, which comprises at least one inductor LN4. The first terminal of the fourth neutral line inductor module is connected to the midpoint of the capacitor module group 5032 of the auxiliary capacitor module 503; the second terminal of the fourth neutral line inductor module is connected to the second neutral line N2.

In an embodiment of the disclosure, as shown in FIG. 8, the inverter unit 501 further comprises a first neutral line switching element SW1, which comprises a control terminal, a first terminal and a second terminal. The first terminal of said first neutral line switching element SW1 is connected selectively to the second terminal of the first neutral line inductor module and the second terminal of the second neutral line inductor module; the second terminal of said first neutral line switching element SW1 is connected to said first neutral line N1. The inverter unit 502 further comprises a second neutral line switching element SW2, which comprises a control terminal, a first terminal and a second terminal. The first terminal of said second neutral line switching element SW2 is connected to the second terminal of the third neutral line inductor module and the second terminal of the fourth neutral line inductor module; and the second terminal of the second terminal of said second neutral line switching element SW2 is connected to the second neutral line N2. In another embodiment of the disclosure, the inverter unit 501 further comprises a third neutral line switching element and a fourth neutral line switching element, each of which comprises a control terminal, a first terminal and a second terminal. Said third neutral line switching element is connected in series with the first neutral line inductor module in said inverter unit 501; said fourth neutral line switching element is connected in series with the second neutral line inductor module. The connection method of the neutral line switch of the inverter unit 502 is similar as that of the inverter unit 501, and it will not be repeated herein. Wherein, each inverter unit in the inverter is a two-level inverter unit or a three-level inverter unit.

In an embodiment of the disclosure, the inverter further comprises a multiple inverter output inductor module, three coupling points and three groups of filter assembly. The multiple inverter output inductor module comprises a first phase multiple inverter output inductor module, a second phase multiple inverter output inductor module, and a third phase multiple inverter output inductor module. Each phase multiple inverter output inductor module comprises at least one inductor L5. The first phase, the second phase, and the third phase multiple inverter output inductor module is coupled correspondingly with the first phase, the second phase, and the third phase output of said multiple inverter output inductor module. Three coupling points: the first coupling point is formed by the connection point between the second terminals of the first phase inverter unit output inductor modules of two inverter units and the first phase multiple inverter output inductor module, the second coupling point is formed by the connection point between the second terminals of the second phase inverter unit output inductor modules of two inverter units and the second phase multiple inverter output inductor module, and the third coupling point is formed by the connection point between the second terminals of the third phase inverter unit output inductor modules of two inverter units and the third phase multiple inverter output inductor module. Three groups of filter assemblies comprise the first group of filter assemblies (for example, filter assembly 504), the second group of filter assemblies and the third group of filter assemblies, and each filter assembly comprises at least one capacitor. The first group, the second group and the third group of filter assemblies is coupled correspondingly with the first, the second and the third coupling point. Wherein, each filter assembly at least comprises one of the following four forms: a filter in which at least two capacitors connected in parallel and/or in series; a damping filter composed of capacitors and resistors; notch filter composed of capacitors and inductors; a notch filter composed of capacitors and inductors; and a damping filter composed of capacitors and resistors, wherein said notch filter and damping filter are connected in parallel. In the present embodiment, it is a combination of the notch filter and damping filter.

Figure 10:
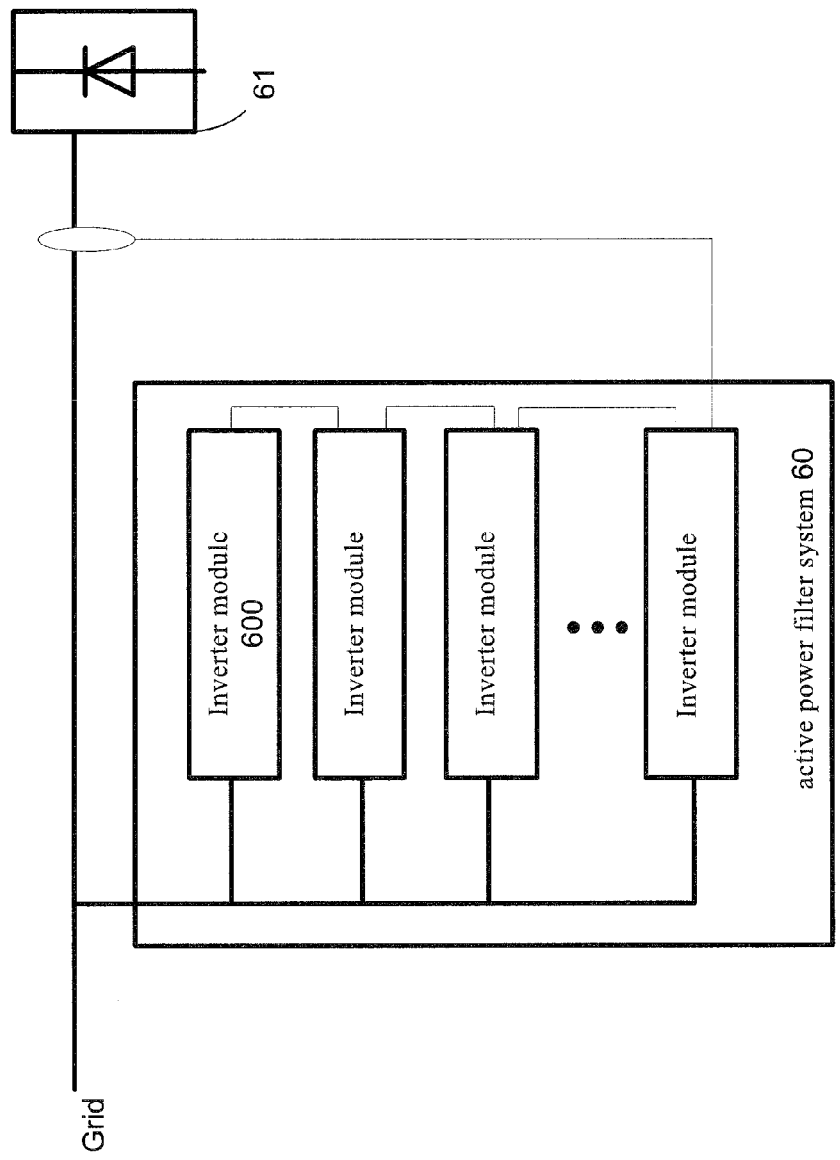
FIG. 10 shows a schematic diagram of an active power filter system formed by traditional inverter modules connected in parallel.

FIG. 10 shows a structure of an active power filter system formed by traditional inverter modules connected in parallel, wherein the active power filter system 60, which comprises internally at least two inverter modules 600 connected in parallel, is connected to a load 61. The inverter modules 600 connected in parallel detect a non-linear load current, and output a harmonic current for supplementing the load harmonic current.

Figure 1:
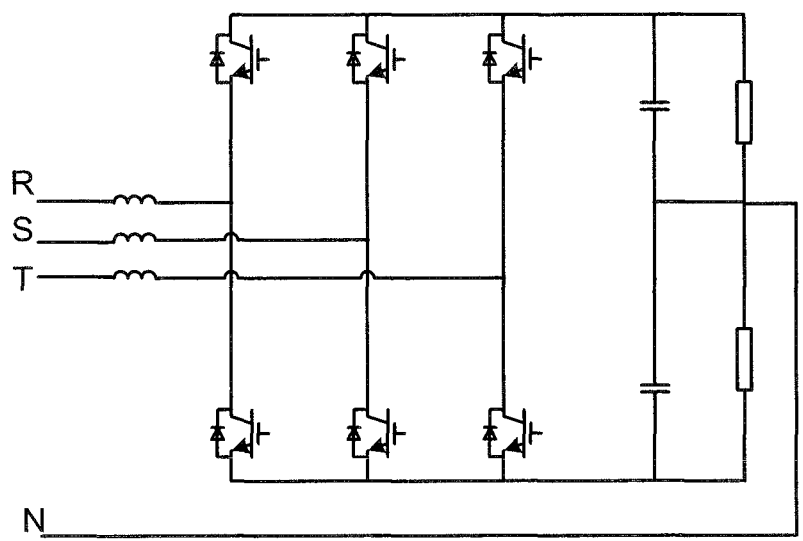
FIG. 1 shows a structure of a traditional two-level inverter.
Figure 2:
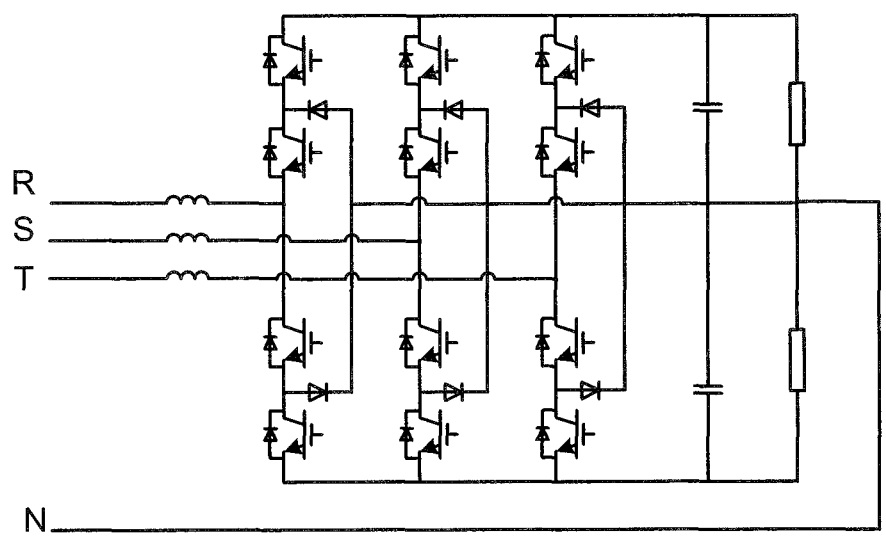
FIG. 2 shows a structure of a traditional three-level inverter.
Figure 9:
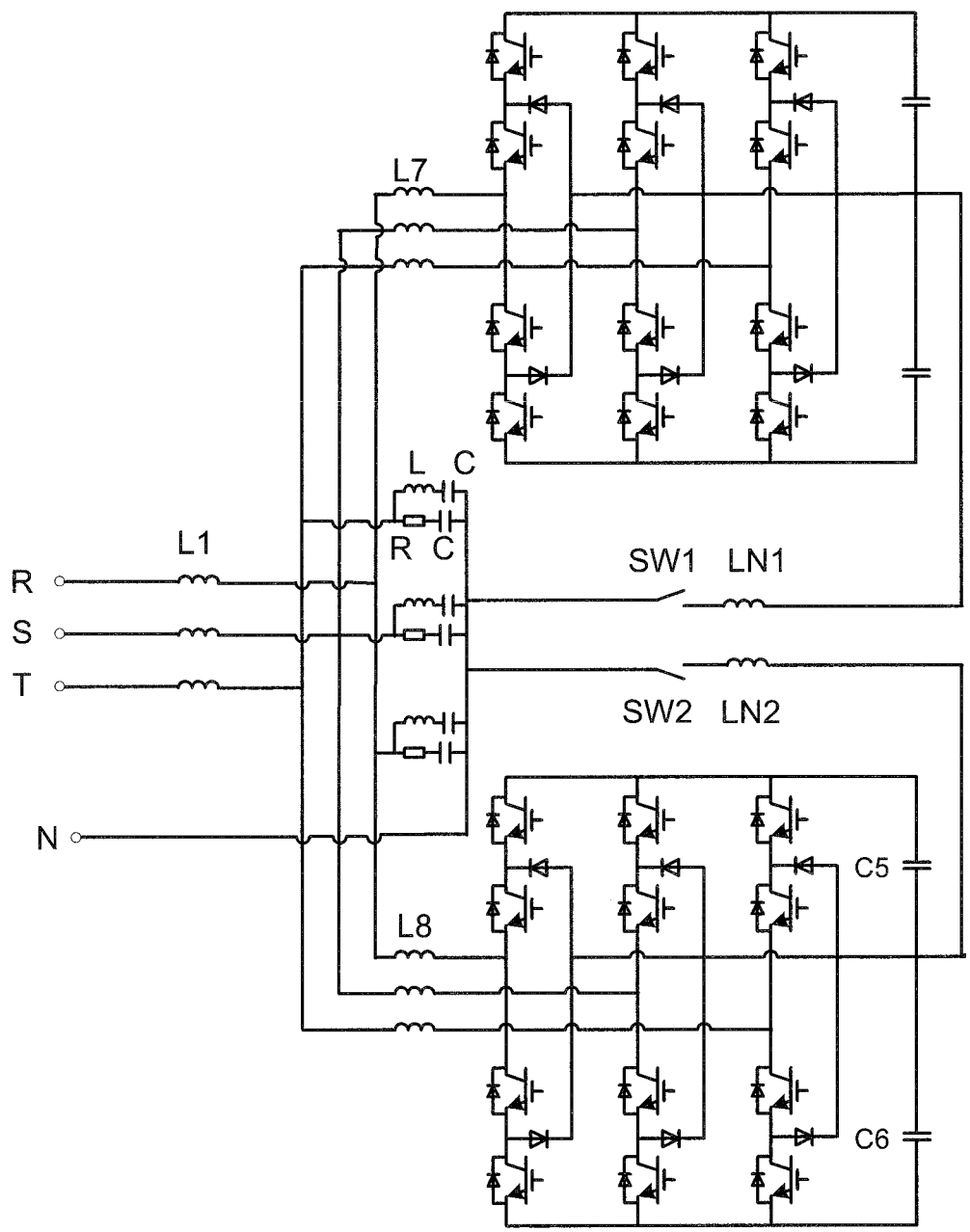
FIG. 9 shows a structure of a multiple three-level inverter in the disclosure.
Figure 11:
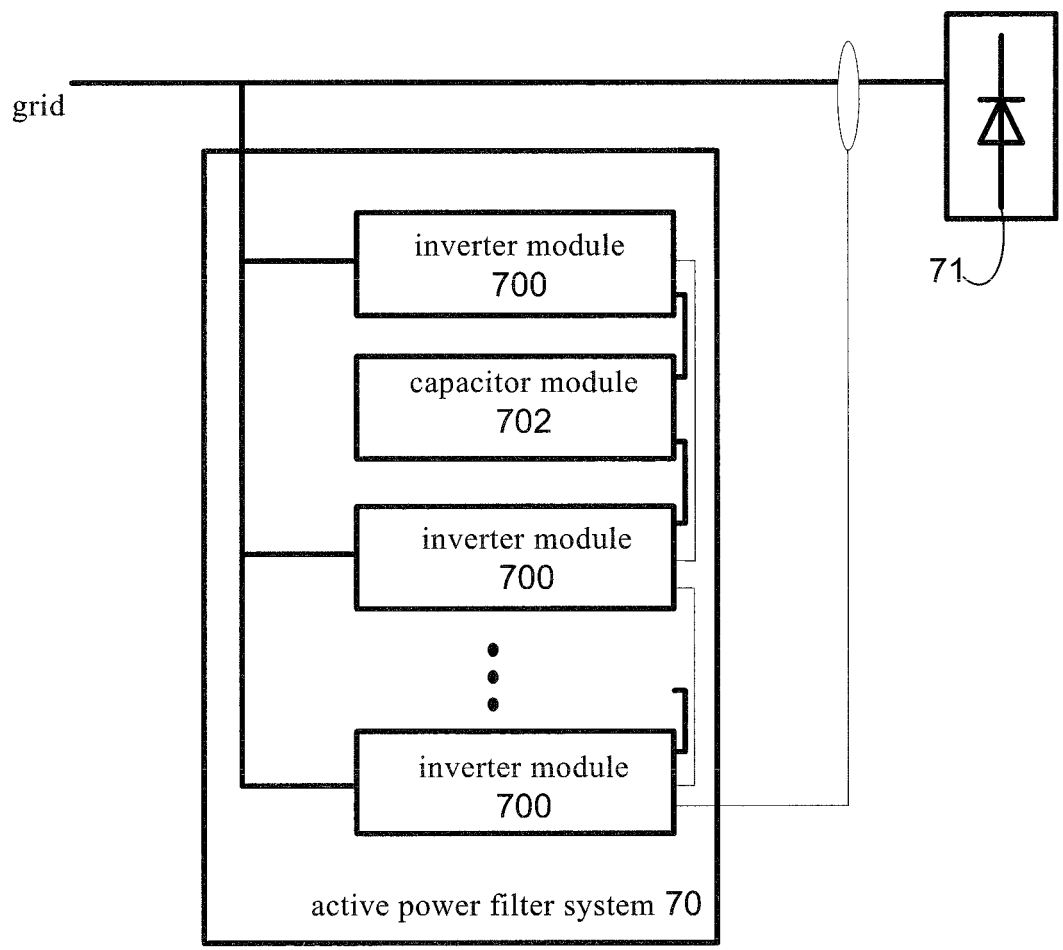
FIG. 11 shows a schematic diagram of an active power filter system formed by auxiliary capacitor module and inverter module connected in parallel in an embodiment of the disclosure.

FIG. 11 shows an active power filter system of the disclosure, the system comprises at least two inverter modules 700 connected in parallel. The internal structure of the inverter modules 700 can be a two-level inverter as shown in FIG. 1, a three-level inverter as shown in FIG. 2 or a multiple inverter as shown in FIG. 9. It can be neutral line inductor aid, or an inverter with filter assembly, or both. Wherein, at least one auxiliary capacitor module 702 is added in the system. Each auxiliary capacitor module 702 comprises at least one capacitor and each auxiliary capacitor module 702 is connected selectively in parallel with the capacitor assembly of at least one inverter module 700. In an embodiment, an auxiliary capacitor module 702 is disposed between each two adjacent inverter modules 700 and said auxiliary capacitor module 702 is connected selectively in parallel with two adjacent inverter modules 700.

The internal structure of the capacitor module 702 and the method for connecting it to the inverter module have been described in detail in the above embodiments, and it will not be repeated herein.

The above embodiments are provided for those skilled in the ordinary technology of the art to realize the disclosure. Various modifications and changes in the above embodiments can be made by those skilled in the ordinary technology of the art without departing from the spirit and scope of the disclosure. Therefore, the scope of the invention is not limited by the above embodiments, rather, it will be the largest scope conforming to the innovative features mentioned in the Claims.

What is claimed is:

1. An inverter, wherein said inverter comprises:
 a three-phase inverter bridge composed of a plurality of switching devices;
 a first inverter output inductor module comprising a first phase inverter output inductor module, a second phase inverter output inductor module, and a third phase inverter output inductor module, wherein each phase inverter output inductor module comprises at least one inductor; one terminal of the first phase, the second phase, and the third phase inverter output inductor modules is coupled correspondingly to the first phase, the second phase, and the third phase of the three-phase inverter bridge, respectively, and another terminal of the first phase, the second phase, and the third phase inverter output inductor module forms the first, the second, and the third phase output of the inverter, respectively;
 a capacitor assembly comprising at least one capacitor, a first terminal and a second terminal, and said capacitor assembly is connected in parallel with said three-phase inverter bridge;
 an auxiliary capacitor module comprising at least one capacitor, a first terminal and a second terminal, wherein the first terminal of said auxiliary capacitor module and the first terminal of said capacitor assembly are connected selectively, and the second terminal of said auxiliary capacitor module and the second terminal of said capacitor assembly are connected selectively.

2. The inverter of claim 1, wherein resistors connected in parallel are further disposed in said auxiliary capacitor module.

3. The inverter of claim 1, wherein said inverter further comprises a neutral line, said neutral line is connected with the midpoint of said capacitor assembly and the midpoint of said auxiliary capacitor module.

4. The inverter of claim 3, wherein said inverter further comprises a first neutral line inductor module, and said first inverter neutral line inductor module comprises at least one inductor, wherein the first terminal of said inverter first neutral line inductor module is connected to the midpoint of said capacitor assembly, the second terminal of said inverter first neutral line inductor module is connected to said neutral line; said auxiliary capacitor module further comprises a second neutral line inductor module, the second neutral line inductor module of said auxiliary capacitor module comprises at least one inductor, wherein the first terminal of the second neutral line inductor module is connected to the midpoint of said auxiliary capacitor module, the second terminal of the second neutral line inductor module is connected to said neutral line.

5. The inverter of claim 4, wherein said inverter further comprises a neutral line switching element, said neutral line switching element comprises a control terminal, a first terminal and a second terminal, wherein the first terminal of said neutral line switching element is connected to the second terminal of said first neutral line inductor module and the second terminal of the second neutral line inductor module, the second terminal of said neutral line switching element is connected to said neutral line.

6. The inverter of claim 4, wherein said inverter further comprises a first neutral line switching element and a second neutral line switching element, each of said neutral line switching elements comprises a control terminal, a first terminal and a second terminal, wherein said first neutral line switching element is connected in series with said first neutral line inductor module, and said second neutral line switching element is connected in series with the second neutral line inductor module of said auxiliary capacitor module.

7. The inverter of claim 1, wherein said inverter is a two-level inverter or a three-level inverter.

8. The inverter of claim 1, wherein said inverter further comprises:
 a second inverter output inductor module comprising a first phase inverter output inductor module, a second phase inverter output inductor module, and a third phase inverter output inductor module, wherein each of the phase inverter output inductor modules comprises at least one inductor; and the first phase, the second phase and the third phase inverter output inductor module is connected in series with the first phase, the second phase and the third phase inverter output inductor module of said first inverter output inductor module, respectively; and three groups of filter assemblies, comprising the first group of filter assemblies, the second group of filter assemblies and the third group of filter assemblies, each group of the filter assemblies at least comprises a capacitor, wherein the first group, the second group, and the third group of filter assemblies is connected correspondingly with: a common connection point between the first phase inverter output inductor module of said first inverter output inductor module and the first phase inverter output inductor module of said second inverter output inductor module, a common connection point between the second phase inverter output inductor module of said first inverter output inductor module and the second phase inverter output inductor module of said second inverter output inductor module, and a common connection point between the third phase inverter output inductor module of said first inverter output inductor module and the third phase inverter output inductor module of said second inverter output inductor module, respectively;

wherein each group of filter assemblies at least comprises one of the following four forms:

a filter in which at least two capacitors connected in parallel and/or in series;

a damping filter composed of capacitors and resistors;

a notch filter composed of capacitors and inductors;

a notch filter composed of capacitors and inductors, and a damping filter composed of capacitors and resistors, wherein said notch filter and said damping filter are connected in parallel.

9. The inverter of claim 1, wherein when the capacitance of the capacitor assembly is required to be increased in order to satisfy the requirement of filtering the ripple current by the capacitor, the first terminal of said auxiliary capacitor module is connected to the first terminal of said capacitor assembly, and the second terminal of said auxiliary capacitor module is connected to the second terminal of said capacitor assembly.

10. The inverter of claim 1, wherein when the capacitance of the capacitor assembly satisfies the requirement of filtering the ripple current by the capacitor, the first terminal of said auxiliary capacitor module and the first terminal of said capacitor assembly are disconnected and/or the second terminal of said auxiliary capacitor module and the second terminal of said capacitor assembly are disconnected.

11. A multiple inverter, wherein said multiple inverter comprises:

at least two inverter units, wherein each inverter unit comprises:

a three-phase inverter bridge composed of a plurality of switching devices;

a capacitor assembly comprising at least one capacitor, a first terminal and a second terminal, said capacitor assembly is connected in parallel with said three-phase inverter bridge; and an inverter unit output inductor module comprising a first phase inverter unit output inductor module, a second phase inverter unit output inductor module, and a third phase inverter unit output inductor module, wherein each phase inverter unit output inductor module comprises at least one inductor, and the first terminal of the first phase, the second phase, and the third phase inverter unit output inductor module is coupled correspondingly to the first phase, the second phase, and the third phase of the three-phase inverter bridge;

three-phase outputs of the multiple inverter comprise a first phase output, a second phase output and a third phase output, wherein the second terminals of the first phase inverter unit output inductor modules of inverter units are connected together to form the first phase output of the multiple inverter, the second terminals of the second phase inverter unit output inductor modules of inverter units are connected together to form the second phase output of the multiple inverter, the second terminals of the third phase inverter unit output inductor modules of inverter units are connected together to form the third phase output of the multiple inverter; and an auxiliary capacitor module comprising at least two capacitor module groups, each capacitor module group comprises at least one capacitor, a first terminal and a second terminal, wherein the first terminal of one capacitor module group and the first terminal of the capacitor assembly of one of the inverter units are connected selectively, and the second terminal of the capacitor module group and the second terminal of the capacitor assembly of said inverter unit are connected selectively;

wherein the drive signals of the switching devices of the three-phase inverter bridge of the respective inverter units have certain angle difference with each other.

12. The multiple inverter of claim 11, wherein resistors connected in parallel are further comprised in each capacitor module group of said auxiliary capacitor module.

13. The multiple inverter of claim 11, wherein said inverter further comprises a neutral line, said neutral line is connected to the midpoint of the capacitor assembly of each inverter unit and the midpoint of each capacitor module group of said auxiliary capacitor module.

14. The multiple inverter of claim 13, wherein said inverter further comprises a first neutral line inductor module, the neutral line inductor module of each inverter unit comprises at least one inductor, wherein the first terminal of the first neutral line inductor module of each inverter unit is connected to the midpoint of the capacitor assembly of each inverter unit, the second terminal of the first neutral line inductor module of each inverter unit is connected to said neutral line; each capacitor module group of said auxiliary capacitor module further comprises a second neutral line inductor module, the second neutral line inductor module of each capacitor module group of said auxiliary capacitor module comprises at least one inductor, wherein the first terminal of the second neutral line inductor module is connected to the midpoint of each capacitor module group of said auxiliary capacitor module, and the second terminal of the second neutral line inductor module is connected to said neutral line.

15. The multiple inverter of claim 14, wherein each inverter unit further comprises a neutral line switching element, each neutral line switching element comprises a control terminal, a first terminal and a second terminal, wherein the first terminal of each neutral line switching element is connected correspondingly to the second terminal of the first neutral line inductor module of its corresponding inverter unit and the second terminal of the second neutral line inductor module of the capacitor module group of its corresponding auxiliary capacitor module, the second terminal of each neutral line switching element is connected to said neutral line.

16. The multiple inverter of claim 14, wherein each inverter unit further comprises a first neutral line switching element and a second neutral line switching element, each switching element comprises a control terminal, a first terminal and a second terminal, wherein the first neutral line switching element of each inverter unit is connected in series with the first neutral line inductor module of its corresponding inverter unit, the second neutral line switching element of each inverter unit is connected in series with the second neutral line inductor module of the capacitor module group of its corresponding auxiliary capacitor module.

17. The multiple inverter of claim 11, wherein each inverter unit in said inverter is a two-level inverter unit or a three-level inverter.

18. The multiple inverter of claim 11, wherein said inverter further comprises:
   a multiple inverter output inductor module, comprising a first phase multiple inverter output inductor module, a second phase multiple inverter output inductor module, and a third phase multiple inverter output inductor module, each phase multiple inverter output inductor module comprises at least one inductor, wherein the first phase, the second phase and the third phase multiple inverter output inductor module is coupled correspondingly to the first phase, the second phase and the third phase output of said multiple inverter;
   three coupling points, the first coupling point is formed by the connection point between the second terminals of the first phase inverter unit output inductor modules of inverter units and the first phase multiple inverter output inductor module, the second coupling point is formed by the connection point between the second terminals of the second phase inverter unit output inductor modules of inverter units and the second phase multiple inverter output inductor module, and the third coupling point is formed by the connection point between the second terminals of the third phase inverter unit output inductor modules of inverter units and the third phase multiple inverter output inductor module; and
   three groups of filter assemblies, comprising the first group of filter assemblies, the second group of filter assemblies, and the third group of filter assemblies, each group of filter assemblies comprises at least one capacitor, wherein the first group, the second group and the third group of filter assemblies is coupled correspondingly to the first, the second, and the third coupling point.
   Wherein, each group of filter assemblies at least comprises one of the following four forms:
   a filter in which at least two capacitors connected in parallel and/or in series;
   a damping filter composed of capacitors and resistors;
   a notch filter composed of capacitors and inductors;
   a notch filter composed of capacitors and inductors, and a damping filter composed of capacitors and resistors, wherein said notch filter and said damping filter are connected in parallel.

19. The inverter of claim 11, wherein when the capacitance of the capacitor assembly is required to be increased in order to satisfy the requirement of filtering the ripple current by the capacitor, the first terminal of one of the capacitor module groups is connected to the first terminal of the capacitor assembly of one of the inverter units, and the second terminal of said capacitor module group is connected to the second terminal of the capacitor assembly of said inverter unit.

20. The inverter of claim 11, wherein when the capacitance of the capacitor assembly of said inverter satisfies the requirement of filtering the ripple current by the capacitor, the first terminal of one of the capacitor module group and the first terminal of said capacitor assembly of one of the inverter units are disconnected and/or the second terminal of said capacitor module group and the second terminal of the capacitor assembly of said inverter unit are disconnected.

21. An active power filter system, wherein said active power filter system comprises:
   at least two inverter modules, said at least two inverter modules are connected in parallel;
   at least one auxiliary capacitor module, said auxiliary capacitor module comprises at least one capacitor, wherein each auxiliary capacitor module and at least one inverter module of said at least two inverter modules are connected in parallel selectively.

22. The active power filter system of claim 21, wherein one auxiliary capacitor module is disposed between each two adjacent inverters, said auxiliary capacitor module is connected in parallel with two adjacent inverter modules.

23. The active power filter system of claim 21, wherein said auxiliary capacitor module further comprises resistors connected in parallel.

24. The active power filter system of claim 21, wherein said inverter module is a two-level inverter, said two-level inverter comprises a three-phase inverter bridge arm, an inverter output inductor module, and a capacitor assembly, said capacitor assembly and said three-phase inverter bridge arm are connected in parallel.

25. The active power filter system of claim 21, wherein said inverter is a three-level inverter, said three-level inverter comprises a three-phase inverter bridge arm, an inverter output inductor module, and a capacitor assembly, said capacitor assembly and three-phase inverter bridge arm are connected in parallel.

26. The active power filter system of claim 21, wherein said inverter module is a multiple inverter, said multiple inverter comprises:
   at least two inverter units, wherein each inverter unit comprises:
      a three-phase inverter bridge composed of a plurality of switching devices;
      a capacitor assembly comprising at least one capacitor, said capacitor assembly is connected in parallel with said three-phase inverter bridge; and
      an inverter unit output inductor module comprising a first phase inverter unit output inductor module, a second phase inverter unit output inductor module, and a third phase inverter unit output inductor module, wherein each phase inverter unit output inductor module comprises at least one inductor; the first terminal of the first phase, the second phase, and the third phase inverter unit output inductor module is coupled correspondingly to the first phase, the second phase, and the third phase of the three-phase inverter bridge;
   three-phase output of the multiple inverter comprises the first phase output, the second phase output and the third phase output, and the second terminals of the first phase inverter unit output inductor modules of inverter units are connected together to form the first phase output of the multiple inverter, the second terminals of the second phase inverter unit output inductor modules of inverter units are connected together to form the second phase output of the multiple inverter, the second terminals of the third phase inverter unit output inductor modules of inverter units are connected together to form the third phase output of the multiple inverter.

* * * * *